United States Patent [19]
Schramm et al.

[11] Patent Number: 5,752,748
[45] Date of Patent: May 19, 1998

[54] ELECTRONIC BRAKE SYSTEM WITH BACK-UP CONTROL DURING CENTRAL MODULE FAILURE

[75] Inventors: Dieter Schramm, Stuttgart; Eberhard Schoch, Markgroeningen; Bernd Aupperle, Steinheim; Peter Schubert, Bietigheim-Bissingen; Juergen Binder, Stuttgart; Rainer Heinsohn, Tamm; Eberhard Holl, Oberriexingen; Andreas Kellner, Tamm; Peter Blessing, Heilbronn; Walter Schlagmueller, Schwieberdingen; Frieder Keller, Bretten, all of Germany

[73] Assignee: Robert Bosch GmbH, Stuttgart, Germany

[21] Appl. No.: 624,399

[22] PCT Filed: Nov. 9, 1994

[86] PCT No.: PCT/DE94/01314

§ 371 Date: Apr. 8, 1996

§ 102(e) Date: Apr. 8, 1996

[87] PCT Pub. No.: WO95/13946

PCT Pub. Date: May 26, 1995

[30] Foreign Application Priority Data

Nov. 19, 1993 [DE] Germany .................. 43 39 570.8

[51] Int. Cl.⁶ .................................................. B60T 13/66
[52] U.S. Cl. .................. 303/20; 303/113.4; 303/122.03; 364/424.045
[58] Field of Search .................. 303/20, 113.4, 303/122, 122.03, 122.04, 122.05, 122.08, 155, 122.11; 364/424.05, 424.045

[56] References Cited

U.S. PATENT DOCUMENTS

| | | | |
|---|---|---|---|
| 4,557,528 | 12/1985 | Leiber | 303/92 |
| 4,776,643 | 10/1988 | Leiber | 303/113.4 X |
| 4,850,650 | 7/1989 | Eckert et al. | 303/186 X |
| 4,964,076 | 10/1990 | Schurk | 364/900 |
| 5,176,429 | 1/1993 | Junichi et al. | 303/122.05 |
| 5,230,549 | 7/1993 | Osada et al. | 303/113.4 X |
| 5,255,962 | 10/1993 | Neuhaus et al. | 303/111 |
| 5,302,008 | 4/1994 | Miyake et al. | 303/113.4 X |
| 5,313,104 | 5/1994 | Shibata et al. | 307/10.1 |
| 5,369,584 | 11/1994 | Kajiwara | 364/424.05 |

FOREIGN PATENT DOCUMENTS

4022671  1/1992  Germany .

OTHER PUBLICATIONS

Bantle et al.. "Der Porsche Typ 959–GruppeB–ein besonderes Automobil–Teil 3" A.T.Z. vol. 88, No. 7/8 (Aug. 1986) pp. 407–413.

*Primary Examiner*—Robert J. Oberleitner
*Assistant Examiner*—Pamela J. Lipka
*Attorney, Agent, or Firm*—Felfe & Lynch

[57] ABSTRACT

A central control module generates nominal values for braking based on a pedal input value form a pedal sensor which detects actuation of the brake pedal by the driver, and sensor signals representing wheel speeds. First and second brake control modules transmit sensor signals to the central module, receive nominal values from the central module, and transmit nominal values to the actuators. The first brake control module receives the pedal input value from the pedal sensor directly, and calculates the nominal values as a function of the pedal input value when the central module has failed.

9 Claims, 3 Drawing Sheets

ELECTRONIC BRAKE SYSTEM WITH BACK-UP CONTROL DURING CENTRAL MODULE FAILURE

STATE-OF-THE-ART

An electronic brake system is known from DE 40 22 671 A1, to which U.S. Pat. No. 5,255,962 corresponds.

ADVANTAGES OF THE INVENTION

The invention leads to an electronic brake system with a favorable emergency operating strategy.

DETAILED DESCRIPTION OF THE PREFERRED EMBODIMENT

Figure 1:
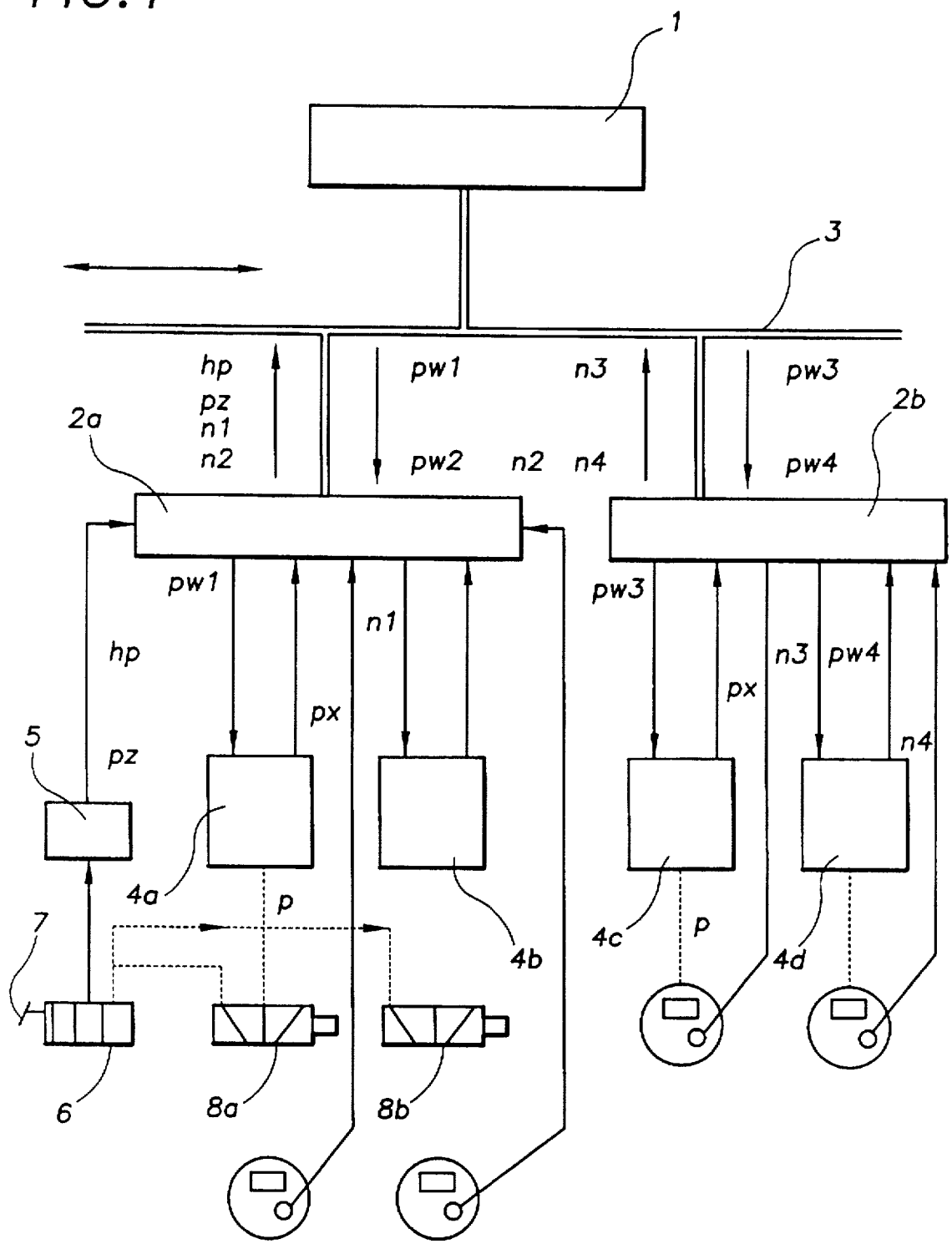
FIG. 1 shows an overall block circuit diagram of a preferred embodiment of the electronic brake system.

FIG. 1 shows a decentralized electronic brake system, which has a central module 1 and brake modules 2a, 2b. The central module has the task of carrying out ABS-ASR calculations, is responsible for the distribution of the braking force, and determines the wheel-specific nominal braking force values $p_{w1}-p_{w4}$. It is also possible for this module to carry out a central monitoring function. Central module 1 can be, for example, a microcomputer with a bus interface. It is not connected directly to sensors or actuators. In a preferred exemplary embodiment, the central module is designed in redundant fashion.

The connection between central module 1 and brake modules 2a, 2b is preferably realized as a serial bus system 3, (e.g. CAN). When central module 1 is designed with redundancy, then bus system 3 will also be realized in redundant fashion.

Brake module 2b is an autonomous unit, which regulates the wheel-specific brake values of an axle, preferably the rear axle, or of a brake circuit. The wheel velocities $n_3$ and $n_4$ of the associated wheels are received at module 2b and are transmitted from there to the central module. In addition, it is also the task of this module to regulate the brake pressures specific to each wheel. For this purpose, the actual brake pressure values $p_x$ are determined. Signals $p_{w3}$, $p_{w4}$ control corresponding actuators 4c and 4d in such a way that the nominal brake pressures are produced by the brakes. Instead of the brake pressure, it is also possible to determine some other variable which determines the brake pressure (e.g., electric current, speed, or rotational angle of a motor driving the actuator). Brake module 2b is an intelligent unit with an interface to the communications system based on a microcomputer of preferably redundant design. In a redundant realization, each of the partial functions required for the braking of a wheel are preferably separated so that each has its own channel in the computer system, and the channels are set up so that they can monitor each other.

The power electronics for driving the electrically actuated actuators connected to them are also present in module 2b.

Brake module 2a carries out the same functions as brake module 2b. It is assigned to the front axle. In addition, it is also connected to a pedal sensor 5, which detects the driver's commands in redundant fashion (distance $h_p$ traveled by pedal 7 and pressure $p_z$ generated by it in cylinder 6). It is also conceivable that the force exerted on the pedal could be measured.

Module 2a is also an intelligent unit based on a microcomputer preferably of redundant design. In a redundant realization, the functions required for the braking of the wheels are separated into two channels, and each channel monitors the other. If the central module fails, module 2a can also perform certain diagnostic functions.

The pressure p generated by actuators 4a, 4b is transmitted to the wheel brakes by separate switching units 8a, 8b, respectively. Under normal operating conditions, the switching units are driven in such a way that a connection exists between actuators 4 and the wheel brakes.

The brake circuit to which module 2a is assigned is also provided with a hydraulic backup. Brake pedal 7 is connected to a master brake cylinder 6. If switching units 8a, 8b should fail, pressure can be transmitted to the wheel brake cylinders by the master cylinder. Normally, wheel speeds $n_1-n_4$ and pedal sensor signals $h_p$ and $p_z$ are transmitted to central unit 1.

Under normal operating conditions, therefore, pedal sensor signals $h_p$ and $p_z$ representing the driver's commands are sent from the first module 2a via the communications system to central module 1. There the driver's command is converted on the basis of predetermined characteristic curves into nominal pressure values for each of the wheel brakes. These nominal pressure values are transmitted via the communications system to brake module 2a for the brakes of the front axle and to brake module 2b for the brakes of the rear axle. Brake modules 2a, 2b then act on a pressure control circuit to produce the predetermined nominal brake pressures $p_w$. In the determination of the nominal pressures from the driver's command, various factors are taken into account such as the braking force distribution, whether or not the vehicle is driving around a curve, different contact pressures of the individual wheel brakes, etc.

There are various practical ways in which the modules can be realized in redundant fashion. In a preferred exemplary embodiment, the microprocessor contained in each of the modules is provided with two channels. This means that the microcomputer consists of two redundant computer cores, which calculate the assigned functions independently of each other. In the preferred exemplary embodiment, the calculation functions are carried out by each of the two computer cores and, on the basis of the results from each of the two computer cores, an error function of the module in question is derived. In another advantageous exemplary embodiment, each of the modules has two microcomputers, redundant to each other. One master computer is monitored as a one-channel microcomputer by the second, redundant microcomputer. By comparison of at least one of the computations carried out by the two computers, a possible error function of the module in question can also be derived in this exemplary embodiment as well.

With this design, the following emergency operating strategy can be implemented:

If central module 1 fails or has a defect, brake module 2a assumes some of its functions. It determines all nominal pressure values $p_{w1}-p_{w4}$ and transmits two of them to module 2b. The ABS and ASR functions are not maintained. Brake modules 2a, 2b can detect the failure of the central module independently of each other through evaluation of the cyclic arrival of status messages from the central module.

If the communications system fails or starts behaving erratically, the brake pressure at the two front wheels is regulated by means of module 2a. Module 2b turns itself off. In this case, the failure of the communications system is detected by the absence of a status message.

If a defect occurs in the pedal sensors, the system switches over to a hydraulic backup; that is, the switching units pass over into the state illustrated. Brake module 2a determines the actual pressure values $p_x$ generated by the backup and sends them to the central module, which evaluates them as inputs for the determination of the nominal pressure values $p_{w3}$, $p_{w4}$ for the brakes assigned to module 2b.

If module 2a itself fails or if a significant defect occurs in it, the hydraulic backup system goes into action. A defect is recognized by comparison of the signals from the redundant processing channels.

If an error occurs in other units of the microprocessor (e.g., in the power electronics), the system again switches over to hydraulic backup. The function of brake module 2b remains intact.

If a defect occurs in brake module 2b or if it fails, it is turned off.

Figure 2:
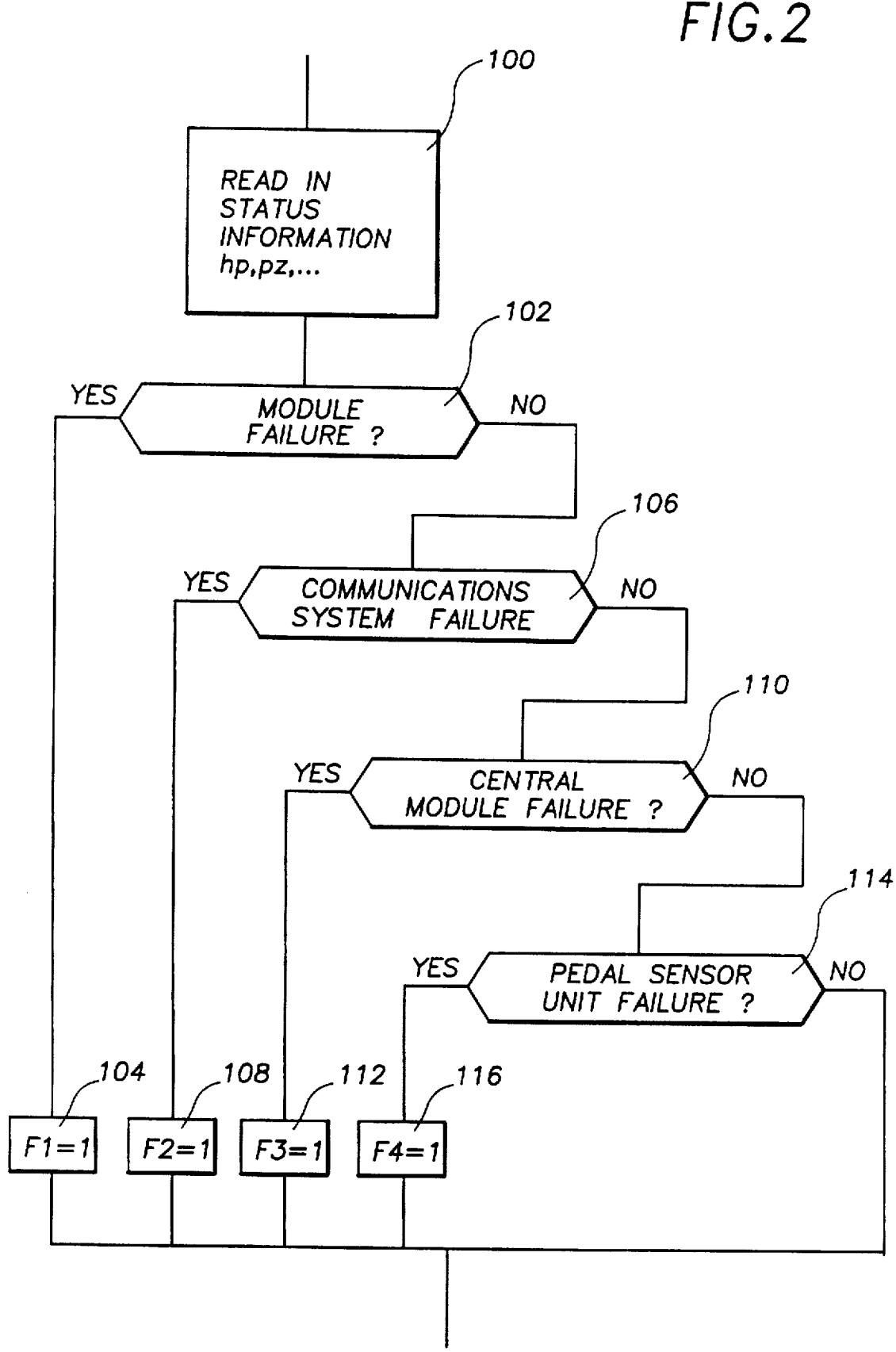
FIG. 2 is a flow chart illustrating the procedure for detecting defects.
Figure 3:
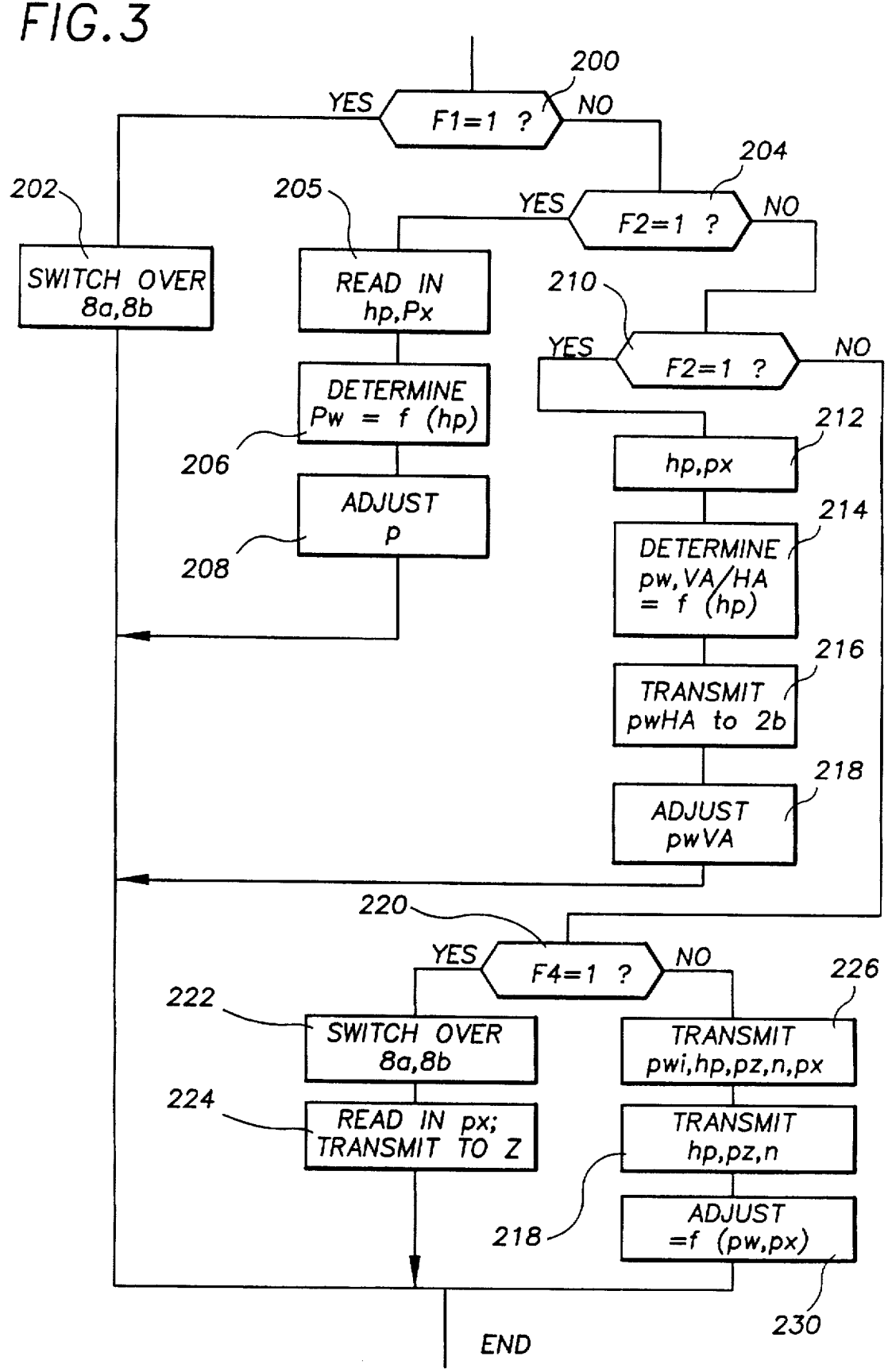
FIG. 3 is a flow chart illustrating the emergency measures when defects are detected.

This emergency operating strategy is sketched in the flow charts of FIGS. 2 and 3, which illustrate a section of a program running in module 2a. FIG. 2 shows the procedure for recognizing defects, whereas FIG. 3 shows the emergency operating measures which are taken when defects occur.

When the section of the program illustrated in FIG. 2 starts, which occurs at predetermined times, the status information transmitted from the central module to brake module 2a via the communications system, the pedal distance $h_p$, and the pressure $p_z$ generated in cylinder 6 are accepted as input in a first step 100. Also in step 100, the results of various calculations such as a measure of the deviation between the nominal and actual pressures, the drive signal for the wheel brake in question calculated on the basis of the deviation, etc., are read into the two computer cores or computers. At least one of these calculation results is compared in step 212 with the value determined by the other computer core or computer. If the deviation between the calculation results is significant, it is assumed that there is a defect in module 2a (step 102). In addition, the power electronics of the module are also checked out. If module 2a is found to be defective, then in step 104 a flag $F_1$ is set to a value of 1. If the comparison of the calculation results has shown that module 2a is functioning properly, then in the following step 106 the system checks to see whether bus system 3 has failed. This is done by checking the status information transmitted by the central module to brake module 2a. If no status information at all is received by brake module 2a, it is assumed that there is a defect in the bus system. In this case, according to step 108, a flag $F_2$ is set to a value of 1. If status information is being received by brake module 2a, then in step 110 the system checks to see whether the central module has a defect. To recognize a defect, the central module sends status information to the brake modules at predetermined times or at predetermined time intervals. If the status information is not received correctly by brake module 2a, e.g., if the information has the wrong level or if it is received at the wrong time, it is assumed that there is a defect in central module 1. In this case, a flag $F_3$ is set to a value of 1 (step 112). If the central module is operating apparently free of defects, the system checks in step 114 to see whether the pedal sensor unit is supplying correct measurement results. This is done in step 114 by comparison of the values for pedal distance $h_p$ and pressure $p_z$. If these values are in agreement within the scope of the tolerances, it is assumed that the pedal sensor unit is operating correctly and that the brake system is operating properly. In the contrary case, it is assumed that the pedal sensor unit has failed, and in step 116 a flag $F_4$ is set to a value of 1. After steps 104, 108, 112, 114, and 116, this section of the program is over and is repeated at the specified time.

The emergency operating measures taken in the case of a defect are described on the basis of the flow chart in FIG. 3. Here, too, the section of the program shown is started at predetermined times. In a first step 200, the system checks to see whether flag $F_1$ has a value of 1, that is, whether a defect in brake module 2a has been detected or not. If a defect is present, a switchover signal for switching valves 8a and 8b is generated in step 202, and the hydraulic braking of the front axle is initiated. Then this part of the program is ended and is repeated at the proper time.

If flag $F_1$ has a value of 0, that is, if module 2a is acknowledged as operating properly, then in step 204 flag $F_2$ is examined to see if it has a value of 1. If it does, it is assumed that the communications system has failed. Brake module 2a therefore determines the nominal pressure values for the associated wheels and adjusts the pressure in them to the specified values. In step 204, therefore, the pedal distance $h_p$ and the actual pressures $p_{xi}$ are accepted as input. Then in step 206 the individual nominal wheel values $p_{wi}$ are determined on the basis of the pedal distance and possibly other parameters. Thereupon, in step 208, the actual pressures prevailing at the time are adjusted in such a way as to make them match the predetermined nominal pressures for each wheel. Thus this section of the program ends.

If flag $F_2$ does not have a value of 1, then in question step 210 the system checks to see if the central module is functioning properly on the basis of the third flag. If this flag $F_3$ has a value of 1, it is assumed that the central module has failed, whereupon brake module 2a accepts pedal distance $h_p$ and the actual pressure values of the wheel brakes $p_{xi}$ as input in step 212. Thereupon, in step 214, the nominal values $p_{wVAi}$ for the wheel brakes of the front axle ($p_{w1}$ and $p_{w2}$) and the nominal pressure values $p_{wHAi}$ for the wheel brakes of the rear axle ($p_{w3}$ and $p_{w4}$) are determined on the basis of pedal distance $h_p$ and possibly other operating variables. In the following step 216, the nominal pressure values for the wheel brakes of the rear axle are transmitted via the communications system to brake module 2b, and in step 218 the pressure in each of the wheel brakes of the front axle is adjusted to match the predetermined nominal value. This section of program is then over. If it was found in step 210 that flag $F_3$ did not have a value of 1, flag $F_4$ is checked in question step 220 to see if it has a value of 1. If it has a value of 1, then it is assumed that the pedal sensor unit has failed, whereupon in step 222 magnetic valves 8a, 8b are switched. As a result, it is possible for the front axle brakes to be driven hydraulically in response to the actuation of the pedal. In step 224 following step 222, the actual pressure values $p_{xi}$ in the wheel brakes are accepted as input and transmitted to the central module. Thus ends this section of the program.

If it was found in step 220 that flag $F_4$ did not have a value of 1 either, it is assumed that the brake system is operating properly. Therefore, in step 226, the nominal pressure values for the wheel brakes transmitted from the central module, the pedal distance $h_p$, the pedal pressure $p_z$, the wheel speeds $n_i$ of the front axle wheels, and the actual pressures $p_{xi}$ of the wheel brakes of the front axle are accepted as input. Thereupon, in step 228, pedal distance $h_p$, pressure $p_z$, and the wheel speeds are transmitted to the central module; and, in the following step 230, the brake pressures in the individual wheel brakes are adjusted to match the predetermined nominal values transmitted by the central module. Thus ends this section of the program, which is repeated at the proper time.

Similar steps of the program are also running in brake module 2b. There, the module is turned off if an error is detected in the module itself of if the communications systems fails, conditions which are recognized by appropriate measures. In this case, the rear axle is braked by the hydraulic brake system. If the central module fails and if the pedal sensor unit also fails, brake module 2b accepts the nominal pressure values for the assigned wheel brakes as input from brake module 2a and adjusts the pressure in the wheel brakes to match the specified values.

In addition to the preferred embodiment in which the brake pressure of the individual wheel brakes is controlled, there is another advantageous embodiment in which it is possible to control the brake pressure of the axle instead of the individual wheel brakes. In other advantageous exemplary embodiments, furthermore, the parameter which is controlled can be the braking moment, the braking effect, the electric current, the positions of the braking devices, the deceleration of the vehicle, etc., instead of the braking pressure. In this case, instead of the nominal braking pressures, the nominal values of the corresponding parameter are determined by the central module and transmitted to the brake modules or determined under emergency operating conditions by one of the brake modules.

In addition to the design shown, in which the pedal sensor unit is connected to brake module 2a, it is also possible in other advantageous exemplary embodiments for the pedal sensor unit to be connected to brake module 2b or to both brake modules. In the former case, the emergency operating strategy described is carried out within the framework of module 2b, whereas in the latter case, it is also possible for the rear axle brakes to be controlled as a function of the actuation of the pedal even after the communications system has failed.

In a preferred exemplary embodiment, the brake modules are attached as separate control units directly to the wheel brakes or to the axles. The central module is separated in space from the brake modules and can also perform other functions besides the braking function such as engine control, transmission control, etc. In another advantageous exemplary embodiment, the modules are combined into a central control unit.

In yet another advantageous exemplary embodiment, the nominal pressure values are calculated in brake module 2a on the basis of the driver's commands and possibly other operating variables either sent directly or transmitted via the communications system. These pressure values are then transmitted via the communications system to the other components. In addition, it is also possible to provide a pneumatic or a purely electrical brake system, in which the emergency operating system according to the invention is used, instead of a hydraulic brake system.

We claim:

1. Electronic brake system for a vehicle having a front axle, a rear axle, wheels on said axles, brakes at said wheels, and a brake pedal for actuating said brakes by a driver, said system comprising a pedal sensor for detecting a pedal input value representing actuation of said brake pedal by said driver, a central module which generates nominal values for braking said wheels based on said pedal input value, actuator means which adjust actual braking parameters to match said nominal values, first and second brake control modules which are each assigned to at least one wheel, said brake control modules transmitting sensor signals to said central module, receiving said nominal values from said central module, and transmitting said nominal values to said actuator means, said first brake control module receiving said pedal input value directly from said pedal sensor, a communications system connecting said central control module and said first and second brake control modules, and means for detecting when said central module has failed, wherein said first brake module calculates said nominal values for said first and second brake modules as a function of said pedal input value at least when said central module has failed, and wherein, when said central control module has failed, said first brake control module sends the nominal values for the wheels assigned to the second brake control module via said communications system to said second brake control module.

2. Electronic brake system as in claim 1 further comprising means for determining when one of said brake control modules has failed, and brake circuit means for connecting said brake pedal to the brakes assigned to said one of said brake modules when said one of said modules has failed.

3. Electronic brake system as in claim 1 wherein said first brake control module transmits said pedal input value to said central module for calculating said nominal values.

4. Electronic brake system as in claim 1 further comprising means for determining when said communications system has failed, said first brake control module calculating the nominal values for the assigned wheels when said communications system has failed.

5. Electronic brake system as in claim 1 wherein said nominal values represent one of brake pressure, a measure of braking moment, a measure of electric current for the brakes, or a measure of brake position.

6. Electronic brake system as in claim 1 further comprising means for determining when said pedal sensor has failed, and brake circuit means for connecting said brake pedal to the brakes assigned to at least one of said brake modules when said pedal sensor has failed.

7. Electronic brake system as in claim 1 wherein said first brake module is assigned to the brakes of the wheels on the front axle.

8. Electronic brake system as in claim 6 further comprising means for determining when said means for detecting a pedal input value has failed, wherein said central module generates said nominal values based on actual braking parameters for the brakes connected to said brake pedal.

9. Electronic brake system for a vehicle having a front axle, a rear axle, wheels on said axles, brakes at said wheels, and a brake pedal for actuating said brakes by a driver, said system comprising a pedal sensor for detecting a pedal input value representing actuation of said brake pedal by said driver, a central module which generates nominal values for braking said wheels based on said pedal input value, actuator means which adjust actual braking parameters to match said nominal values, first and second brake control modules which are each assigned to at least one wheel, said brake control modules transmitting sensor signals to said central module, receiving said nominal values from said central module, and transmitting said nominal values to said actuator means, said first brake control module receiving said pedal input value directly from said pedal sensor, a communications system connecting said central control module and said first and second brake control modules, and means for detecting when said central module has failed, wherein said first brake module calculates said nominal values for said first and second brake modules as a function of said pedal input value at least when said central module has failed;

wherein said first brake module is assigned to the brakes of the wheels on the front axle; and wherein said second brake module is assigned to the brakes of the wheels on the rear axle, said system further comprising means for determining when the second brake module fails, means for turning off the second brake module when it fails, means for determining when said pedal sensor has failed, and means for determining when the first brake module has failed, wherein said second module continues to function if the central module has failed, the first brake module has failed, or the pedal sensor has failed.

\* \* \* \* \*